(No Model.)

J. W. PHILLIPS.
TWO WHEELED VEHICLE.

No. 370,815. Patented Oct. 4, 1887.

Witnesses.
John C. Perkins
Martin A. Dilley

Inventor,
John W. Phillips
By Lewis C. West
Atty.

UNITED STATES PATENT OFFICE.

JOHN W. PHILLIPS, OF KALAMAZOO, MICHIGAN.

TWO-WHEELED VEHICLE.

SPECIFICATION forming part of Letters Patent No. 370,815, dated October 4, 1887.

Application filed July 1, 1887. Serial No. 243,100. (No model.)

*To all whom it may concern:*

Be it known that I, JOHN W. PHILLIPS, a citizen of the United States, residing at Kalamazoo, county of Kalamazoo, State of Michigan, have invented new and useful Improvements in Two-Wheeled Vehicles, of which the following is a specification.

This invention relates to that class of two-wheeled vehicles which employ the ordinary seat-bars fulcrumed at the forward end and a foot-rest hung from said bars; and it has for its object certain improvements below described and claimed.

Figure 1:
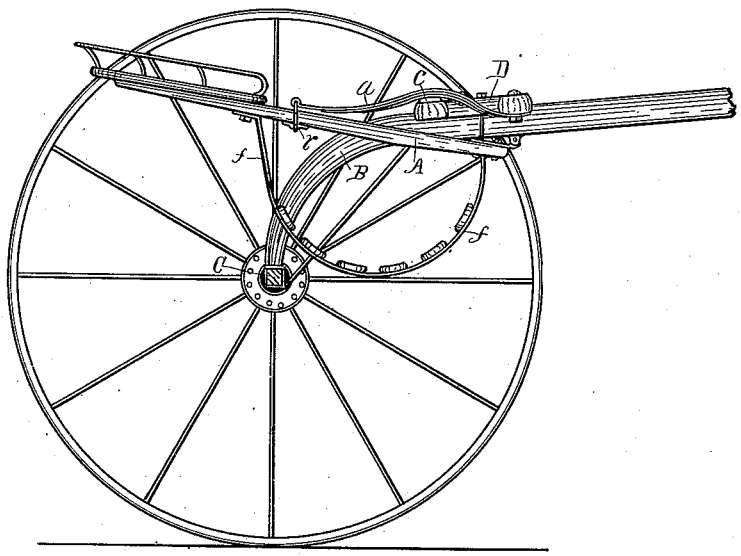
Figure 2:
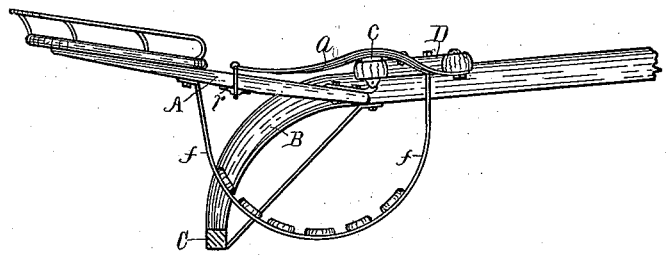

In the drawings, forming a part of this specification, Figure 1 is a side elevation with one wheel and one thill removed, and Fig. 2 shows lettered details in Fig. 1 with a change in the seat-bars.

In Fig. 1 the seat-bars A and foot-rest $f$ are similar to those heretofore employed. The spring $a$ is bowed up in the center and depressed and extended at the end like the bow of a cross-gun. The forward end is rigidly bolted to the under side of the cross-bar D, or, rather, the forward branch of the cross-bar. The upward bow lies on the rear branch of the cross-bar and the rear end is coupled to the link $r$ just forward of the seat. This rear coupling is the same as heretofore used. Between the upper bow of the spring and the rear branch of the cross-bar is a rubber spring, $c$, or any suitable equivalent that will elastically cushion the spring at this point, thus relieving the spring from some of the strain upon it, and at the same time prevent the wear of the spring on the cross-bar, and obviate noise from the friction of parts; but the rubber spring, if preferred, may be dispensed with and a thin piece of leather or the like substituted.

In Fig. 2 the seat-bar is shorter and is fulcrumed to the rear branch of the cross-bar D. Otherwise the construction is the same as in Fig. 1. The important feature in this change is that the strain on the seat-bar rises up on the thill, as the fulcrum is centrally beneath the spring, and there is less liability of breaking the thill than with the construction in Fig. 1. Besides there is a more free spring-action from the fact that the fulcrum is shorter from the rear end of the spring to the forward end of the seat-bar.

The construction on both sides of the vehicle is like the side here shown.

Having thus described my invention, what I claim, and desire to secure by Letters Patent, is—

The seat-bars hinged to the thills, the springs shown, the forward end bolted to the forward branch of the thill cross-bars, the rear end loosely attached to the seat-bars, and the upward bows resting on elastic cushions on the rear branch of the cross-bar of the thills, all combined as set forth.

In testimony of the foregoing I have hereunto subscribed my name in presence of two witnesses.

JOHN W. PHILLIPS.

Witnesses:
 M. A. DILLEY,
 M. D. JENKINS.